United States Patent
Keres et al.

(10) Patent No.: US 10,208,993 B2
(45) Date of Patent: *Feb. 19, 2019

(54) FAULT DETECTION AND DIAGNOSIS FOR REFRIGERATOR FROM COMPRESSOR SENSOR

(71) Applicant: WHIRLPOOL CORPORATION, Benton Harbor, MI (US)

(72) Inventors: Stephen L. Keres, Stevensville, MI (US); Alberto Regio Gomes, Saint Joseph, MI (US); Andrew D. Litch, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 145 days.

This patent is subject to a terminal disclaimer.

(21) Appl. No.: 15/343,391

(22) Filed: Nov. 4, 2016

(65) Prior Publication Data
US 2017/0074566 A1    Mar. 16, 2017

Related U.S. Application Data

(63) Continuation of application No. 13/531,707, filed on Jun. 25, 2012, now Pat. No. 9,513,043.

(51) Int. Cl.
*F25B 49/00* (2006.01)
*F04B 51/00* (2006.01)

(52) U.S. Cl.
CPC ............ *F25B 49/005* (2013.01); *F04B 51/00* (2013.01); *F25B 2500/19* (2013.01);
(Continued)

(58) Field of Classification Search
CPC ............. F25B 49/005; F25B 2700/172; F25B 2600/02; F25B 2700/2117;
(Continued)

(56) References Cited

U.S. PATENT DOCUMENTS 4,848,096 A    7/1989    Funahashi et al.
5,426,951 A    6/1995    Yamashita et al.
(Continued)

FOREIGN PATENT DOCUMENTS

EP    1541869 A1    6/2005
EP    2355333 A2    8/2011
(Continued)

OTHER PUBLICATIONS

Yuichi et al., Controller for Air Conditioner, Oct. 24, 2000, JP2000297968A, Whole Document.*

(Continued)

*Primary Examiner* — Larry Furdge
(74) *Attorney, Agent, or Firm* — Price Heneveld LLP

(57) ABSTRACT

A refrigerator, a sealed refrigerant system, and method are provided where the refrigerator includes at least a refrigerated compartment and a sealed refrigerant system including an evaporator, a compressor, a condenser, a controller, an evaporator fan, and a condenser fan. The method includes monitoring a frequency of the compressor, and identifying a fault condition in the at least one component of the refrigerant sealed system in response to the compressor frequency. The method may further comprise calculating a compressor frequency rate based upon the rate of change of the compressor frequency, wherein a fault in the condenser fan is identified if the compressor frequency rate is positive and exceeds a condenser fan fault threshold rate, and wherein a fault in the evaporator fan is identified if the compressor frequency rate is negative and exceeds an evaporator fan fault threshold rate.

20 Claims, 6 Drawing Sheets

(52) U.S. Cl.
CPC ..... *F25B 2600/02* (2013.01); *F25B 2600/021* (2013.01); *F25B 2600/111* (2013.01); *F25B 2600/112* (2013.01); *F25B 2600/2507* (2013.01); *F25B 2700/171* (2013.01); *F25B 2700/172* (2013.01); *F25B 2700/2117* (2013.01); *F25B 2700/21171* (2013.01); *Y02B 30/741* (2013.01); *Y02B 30/743* (2013.01)

(58) Field of Classification Search
CPC .... F25B 2700/21171; F25B 2600/2507; F25B 2600/112; F25B 2600/111; F25B 2600/021
See application file for complete search history.

(56) References Cited

U.S. PATENT DOCUMENTS

| | | |
|---|---|---|
| 6,615,594 B2 | 9/2003 | Jayanth et al. |
| 6,758,050 B2 | 7/2004 | Jayanth et al. |
| 6,960,893 B2 | 11/2005 | Yoshida et al. |
| 7,082,380 B2 | 7/2006 | Wiebe et al. |
| 7,647,783 B2 | 1/2010 | Jayanth et al. |
| 7,765,818 B2 | 8/2010 | Buck |
| 7,845,179 B2 | 12/2010 | Singh et al. |
| 2003/0213256 A1 | 11/2003 | Ueda et al. |
| 2004/0211202 A1 | 10/2004 | Katogi et al. |
| 2006/0041335 A9 | 2/2006 | Rossi et al. |
| 2008/0066474 A1 | 3/2008 | Porter et al. |
| 2008/0077260 A1 | 3/2008 | Porter et al. |
| 2010/0101250 A1 | 4/2010 | Jayanth et al. |
| 2010/0293397 A1 | 11/2010 | Pham et al. |

FOREIGN PATENT DOCUMENTS

| | | | |
|---|---|---|---|
| JP | 7280399 | | 10/1995 |
| JP | 8219601 | | 8/1996 |
| JP | 9159293 | | 6/1997 |
| JP | 2000297968 | | 10/2000 |
| JP | 2000297968 A | * | 10/2000 |

OTHER PUBLICATIONS

Whitman, et al., "Refrigeration and Air Conditioning Technology," Unit 12, Basic Electricity and Magnetism, Delmar, 6th Edition, pp. 226-229, 233-238, 362.

* cited by examiner

FAULT DETECTION AND DIAGNOSIS FOR REFRIGERATOR FROM COMPRESSOR SENSOR

CROSS-REFERENCE TO RELATED APPLICATION

This application is a continuation of U.S. patent application Ser. No. 13/531,707 filed on Jun. 25, 2012, entitled "FAULT DETECTION AND DIAGNOSIS FOR REFRIGERATOR FROM COMPRESSOR SENSOR," the entire disclosure of which is incorporated herein by reference.

STATEMENT REGARDING FEDERALLY SPONSORED RESEARCH AND DEVELOPMENT

This invention was made with government support under Award No. DE-EE0003910, awarded by the U.S. Department of Energy. The government has certain rights in the invention.

BACKGROUND OF THE INVENTION

The present invention generally relates to fault detection and diagnosis for a sealed refrigerant system, which may be part of a refrigerator.

SUMMARY OF THE INVENTION

According to one aspect of the present invention, a refrigerant sealed system is provided that comprises: an evaporator receiving refrigerant in liquid phase for evaporating the refrigerant into a vapor phase; an evaporator fan for moving air external to the evaporator; a compressor for receiving the refrigerant in vapor phase and for compressing the refrigerant; a condenser for receiving the refrigerant in vapor phase and for condensing the refrigerant into a liquid phase that is supplied to the evaporator; a condenser fan for moving air external to the condenser; and a controller coupled to the compressor for transmitting control signals to the compressor and for receiving a feedback signal from the compressor that is indicative of a compressor frequency of the compressor, the controller identifying a fault in at least one of the compressor, condenser fan, and evaporator fan as a function of the compressor frequency.

According to another aspect of the present invention, a method is disclosed for detecting a fault condition in at least one component of a refrigerant sealed system, where the sealed system comprises at least one of the following components: a compressor, an evaporator fan, and a condenser fan. The method comprises: monitoring a compressor frequency of the compressor; and identifying a fault condition in the at least one component of the refrigerant sealed system in response to the compressor frequency of the compressor.

According to another aspect of the present invention, a refrigerator is provided that comprises: at least one refrigerated compartment; an evaporator receiving refrigerant in liquid phase for evaporating the refrigerant into a vapor phase; an evaporator fan for moving air between the evaporator and the at least one refrigerated compartment; a compressor for receiving the refrigerant in vapor phase and for compressing the refrigerant; a condenser for receiving the refrigerant in vapor phase and for condensing the refrigerant into a liquid phase that is supplied to the evaporator; a condenser fan for moving air external to the condenser; and a controller coupled to the compressor for transmitting control signals to the compressor and for receiving a feedback signal from the compressor that is indicative of an operating compressor frequency of the compressor, the controller identifying a fault in at least one of the compressor, condenser fan, and evaporator fan as a function of the compressor frequency.

These and other features, advantages and objects of the present invention will be further understood and appreciated by those skilled in the art by reference to the following specification, claims and appended drawings.

DETAILED DESCRIPTION OF PREFERRED EMBODIMENT

Figure 1:
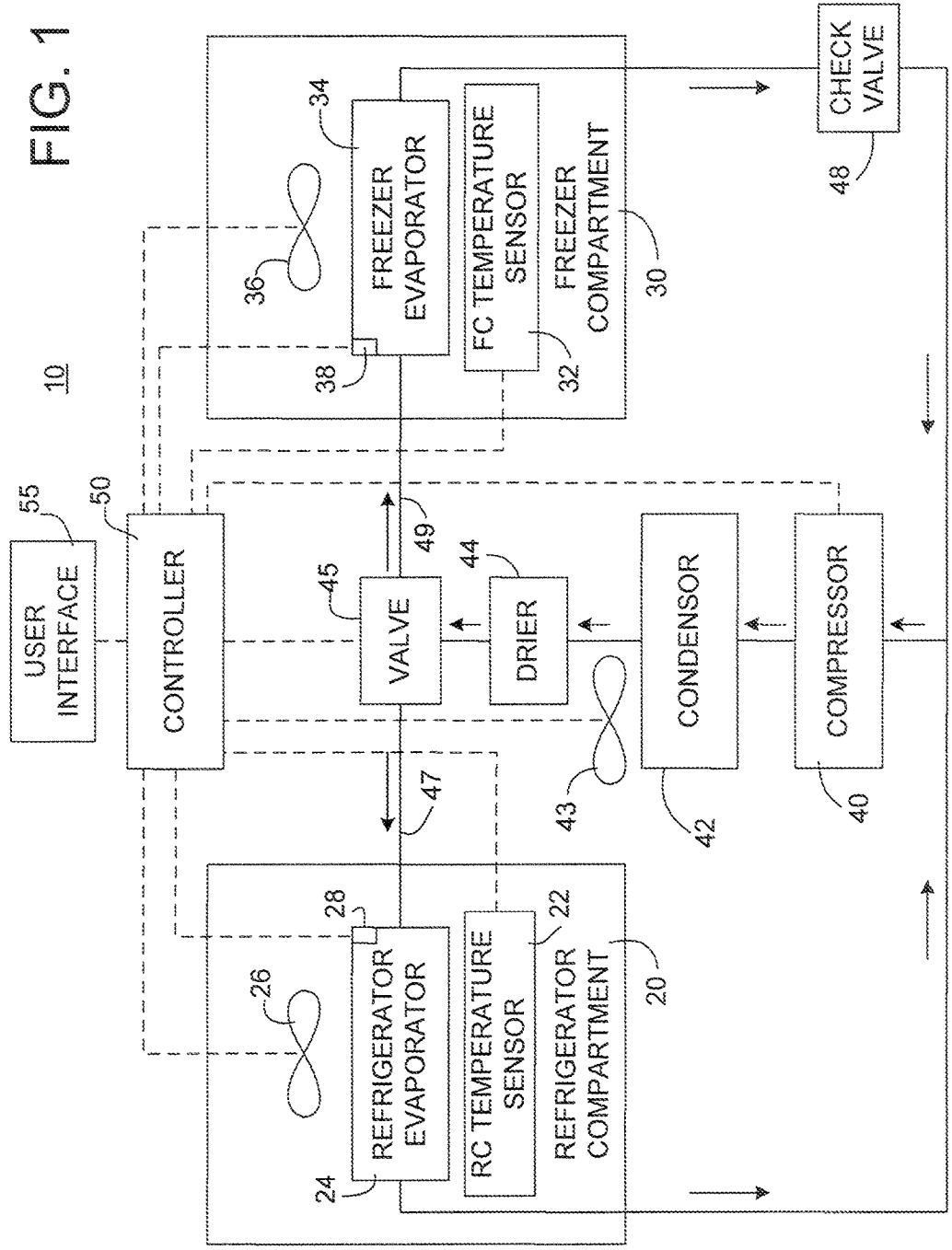
FIG. 1 is a schematic representation of a refrigerator constructed in accordance with a first embodiment.

Reference will now be made in detail to the present preferred embodiment of the invention, an example of which is illustrated in the accompanying drawings. Wherever possible, the same reference numerals will be used throughout the drawings to refer to the same or like parts.

FIG. 1 shows a schematic representation of a refrigerator 10 in which the diagnostic system may be implemented. The refrigerator 10 includes at least one refrigerated compartment in the form of a refrigerator compartment 20 and an optional freezer compartment 30, and a sealed refrigerant system for cooling the refrigerated compartment. Refrigerator 10 further includes an evaporator (24, 34), an evaporator fan (26, 36), a compressor 40, a condenser 42, a condenser fan 43, and a controller 50. Evaporator (24, 34) receives refrigerant in liquid phase for evaporating the refrigerant into a vapor phase. Evaporator fan (26, 36) is provided for moving air external to evaporator (24, 34) and into the refrigerated compartment (20, 30). Compressor 40 receives the refrigerant in vapor phase and compresses the refrigerant. Condenser 42 receives the refrigerant in vapor phase and condenses the refrigerant into a liquid phase that is supplied to evaporator (24, 34). Condenser fan 43 moves air external to condenser 42. Additional details of the system shown in FIG. 1 are described below.

Figure 2:
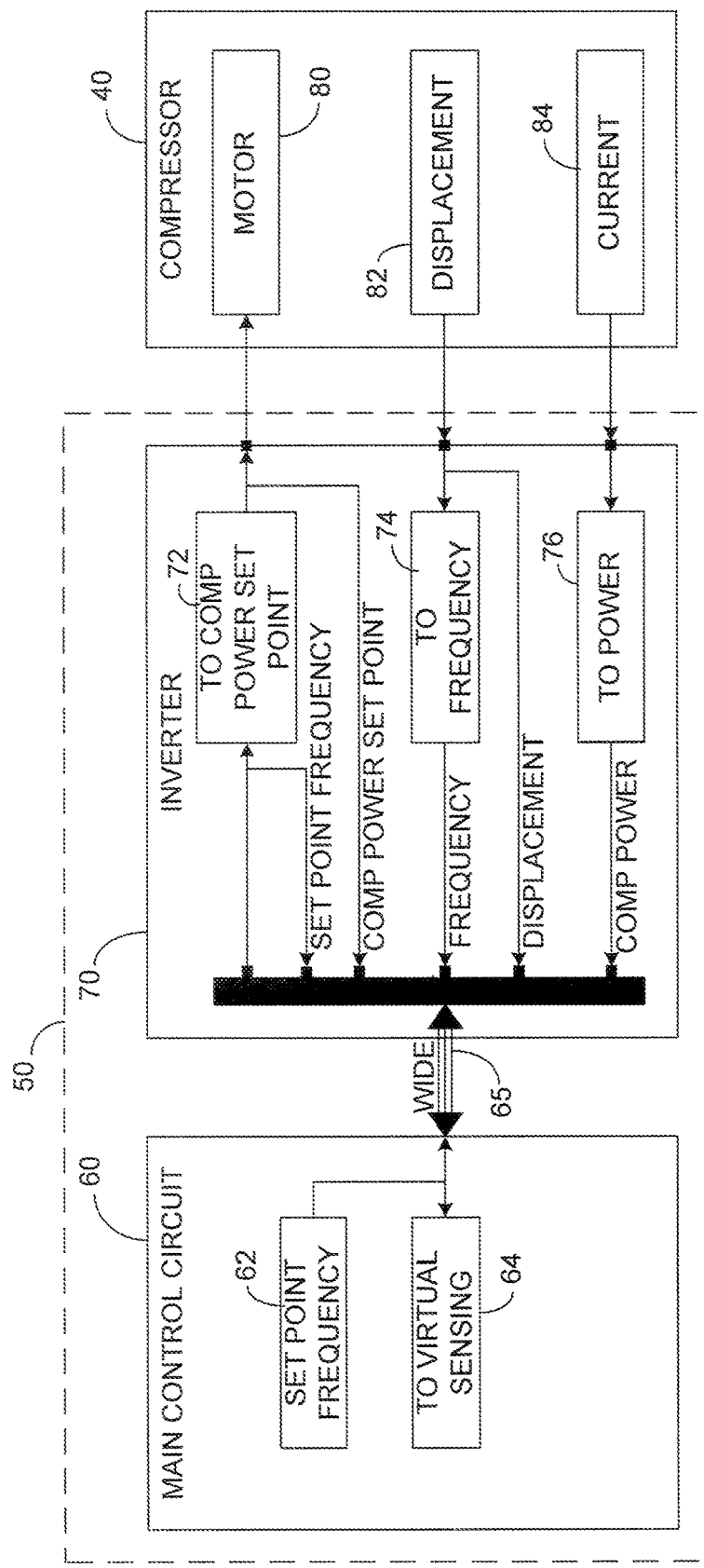
FIG. 2 is a schematic representation of the controller and compressor of FIG. 1.

Controller 50 is coupled to compressor 40 for transmitting control signals to compressor 40 and for receiving a feedback signal from compressor 40, which is indicative of a compressor frequency of compressor 40 (see FIG. 2). Controller 50 may identify a fault in at least one of compressor 40, condenser fan 43, and evaporator fan (26, 36) as a function of the compressor frequency and optionally a time trigger period as explained further below. As used herein, the phrase "as a function of the compressor frequency" means that the controller identifies a fault in response to the compressor frequency or in response to a parameter calculated or determined using the compressor frequency or a derivative thereof.

Controller 50 may monitor the compressor frequency ($f_{COMP}$) over time and calculate a derivative thereof in the form of a compressor frequency rate (Freq Rate) based upon the rate of change of the compressor frequency over time, where Freq Rate=$\partial f_{COMP}/\partial t$. As explained below, the compressor frequency rate is useful to identify failures in evaporator fan(s) (26, 26) and condenser fan 43.

As shown in FIG. 2, controller 50 includes a main control circuit 60 and an inverter 70, which is coupled to both main control circuit 60 and compressor 40. Main control circuit 60 may include a microprocessor and provides a set point frequency 62 to inverter 70 via a WIDE communication bus 65 while providing virtual sensing 64 of faults of components within the sealed refrigerant system. Compressor 40 may be a linear compressor such as the Britten linear compressor available from Embraco. As shown in FIG. 2, compressor 40 includes a motor 80 in which a piston is displaced by a measurable displacement 82, which is fed back to inverter 70 along with the measured current 84 flowing through motor 80. One skilled in the art will appreciate that alternative controller designs may be used, either as a single part, or multiple parts or even a part of another controller, for feedback, measurement and/or control of the invention.

Inverter 70 receives the set point frequency from main control circuit 60 and converts it into a set point power 72 that is provided to compressor motor 80 and is also fed back to main control circuit 60. Motor 80, if operating properly, will respond to the set point power supplied from inverter 70 by displacing its piston the appropriate amount of stroke at the appropriate time intervals such that the operation of compressor 40 may be precisely controlled by controller 50. Inverter 70 also receives the displacement from compressor 40 and converts the displacement to the compressor frequency $f_{COMP}$ in functional block 74. Inverter 70 also receives the measured current from compressor 40 and converts it to the compressor power in functional block 76. Main control circuit 60 receives the following feedback signals from inverter 70: set point frequency ($f_{SET}$); compressor frequency ($f_{COMP}$); displacement; compressor set point power; and compressor power.

The refrigerator shown in FIG. 1 is a sequential dual evaporator refrigerator in that it includes both refrigerator compartment 20 and freezer compartment 30 as well as separate evaporators for each compartment, namely, a refrigerator evaporator 24 associated with refrigerator compartment 20 and a freezer evaporator 34 associated with freezer compartment 30, wherein the refrigerant is sequentially supplied to each evaporator using a valve 45 and compressor 40. Valve 45 is fluidly coupled between compressor 40 and refrigerator evaporator 24 and freezer evaporator 34, wherein, in response to a valve control signal, valve 45 is selectively operative to open or close between compressor 40 and refrigerator evaporator 24 to allow or prevent refrigerant from flowing therebetween and to open or close between compressor 40 and freezer evaporator 34 to allow or prevent refrigerant from flowing therebetween. Separate evaporator fans 26 and 36 are provided for refrigerator evaporator 24 and freezer evaporator 34, respectively.

Although a sequential dual evaporator refrigerator is illustrated, the present system may be implemented in any form of refrigerator having a compressor, evaporator fan, and/or condenser fan.

Refrigerator 10 may further comprise one or more refrigerator compartment(s) (RC), temperature sensor(s) 22 for sensing an actual refrigerator compartment temperature, and one or more freezer compartment(s) (FC) temperature sensor 32 for sensing an actual freezer compartment temperature. Controller 50 is electrically coupled to compressor 40 (or alternatively coupled, directly or indirectly, to allow communication by, from or to controller 50 and compressor 40), valve 45, refrigerator compartment temperature sensor 22, and freezer compartment temperature sensor 32. In the sequential dual evaporator refrigerator shown in FIG. 1, controller 50 is programmed or otherwise configured for turning compressor 40 on and off, for selecting operational states of valve 45, and for determining a current refrigerator system mode in response to a refrigerator compartment cooling priority and a freezer compartment cooling priority.

A refrigerator evaporator temperature sensor 28 may be provided on or at/near refrigerator evaporator 24 so as to sense the temperature thereof and provide the sensed temperature to controller 50. Similarly, a freezer evaporator temperature sensor 38 may be provided on or at/near freezer evaporator 34 so as to sense the temperature thereof and provide the sensed temperature to controller 50. Controller 50 may use these temperature readings to control fans 26 and 36.

Refrigerator 10 may additionally include a drier 44 fluidly connected between condenser 42 and valve 45. A check valve 48 may be provided between the output line of freezer evaporator 34 and compressor 40 so as to prevent backflow of refrigerant to freezer evaporator 34.

The sealed refrigerant system may further include pressure sensors (not shown) for sensing pressures within the sealed system at various locations.

Lastly, refrigerator 10 may include a user interface 55 coupled to controller 50 for allowing a user to manually set a desired refrigerator compartment temperature and a desired freezer compartment temperature. User interface 55 may optionally include door open sensors for both refrigerator compartment 20 and freezer compartment 30. User interface 55 may be optionally located within the refrigerator 10 or even remote to refrigerator 10.

In general, refrigerator 10 is controlled by controller 50, which executes an algorithm in order to control the operation of valve 45, compressor 40, refrigerator evaporator fan 26, optional freezer evaporator fan 36, and condenser fan 43 in response to various inputs from user interface 55, RC temperature sensor 22, FC temperature sensor 32, refrigerator evaporator temperature sensor 28, and freezer evaporator temperature sensor 38.

Having generally described the structure of refrigerator 10, a method of detecting a fault condition in at least one component of a refrigerant sealed system is now described. The sealed system comprises at least one of the following components: a compressor, an evaporator fan, and a condenser fan. The method generally may comprise the steps of: monitoring a compressor frequency of the compressor; and identifying a fault condition in the at least one component of the refrigerant sealed system in response to the compressor frequency of the compressor. Optionally, the method may further comprise the step of calculating a compressor frequency rate based upon the rate of change of the compressor frequency, wherein a fault in the condenser fan is identified if the compressor frequency rate is positive and exceeds a condenser fan fault threshold rate for at least a condenser time trigger period. The method may also comprise the step of calculating a compressor frequency rate based upon the rate of change of the compressor frequency, wherein a fault in the evaporator fan is identified if the compressor frequency rate is negative and exceeds an evaporator fan fault threshold rate for at least an evaporator time trigger period. An example of a self-diagnostic algorithm executed by controller 50 (FIGS. 1 and 2) for performing this method is discussed further below with reference to FIGS. 3A and 3B.

In step 100, controller 50 begins by reading the compressor frequency ($f_{COMP}$) and the compressor set point frequency $f_{SET}$. Then, controller 50 determines whether $f_{COMP}$ is equal to a first compressor fault indicator of, for example, +∞ in step 102. As used herein, "+∞" is a particular designation used by the Britten linear compressor to designate that there is no feedback signal from the inverter; however, the first compressor fault indicator may have any other designation. If $f_{COMP}$ is equal to +∞, controller 50 increments a first counter ($T_{CA}$) in step 104 before determining whether $T_{CA}$ exceeds a first compressor time trigger period ($THRESH_{COMPA}$) in step 106. If $T_{CA}$ does not exceed $THRESH_{COMPA}$, controller 50 determines that there is no fault in step 108 and then returns to step 100. If $T_{CA}$ exceeds $THRESH_{COMPA}$, and hence the compressor frequency ($f_{COMP}$) reached the first compressor fault indicator (+∞) for a first compressor time trigger period ($THRESH_{COMPA}$), controller 50 determines that there is a first type of fault in compressor 40 in step 110. This first type of fault is indicative of a loss of the feedback signal to main control circuit 60.

If, in step 102, controller 50 determines that $f_{COMP}$ is not equal to +∞, controller 50 decrements $T_{CA}$ if $T_{CA}$ is greater than zero in step 112. Then, in step 114, controller 50 determines whether a difference between the compressor set point frequency and the compressor frequency as measured by controller 50 ($|f_{SET}-f_{COMP}|$) exceeds a second compressor fault threshold ($THRESH_2$). If so, controller increments a second counter ($T_{CB}$) in step 116 prior to determining whether $T_{CB}$ exceeds a second compressor time trigger period ($THRESH_{COMPB}$) in step 118. If $T_{CB}$ does not exceed $THRESH_{COMPB}$, controller 50 determines that there is no fault in step 120 and then returns to step 100. If $T_{CB}$ exceeds $THRESH_{COMPB}$, and hence the difference between compressor set point frequency ($f_{SET}$) and the compressor frequency ($f_{COMP}$) as measured by controller 50 exceeds a second compressor fault threshold ($THRESH_2$) for at least a second compressor time trigger period ($THRESH_{COMPB}$), controller 50 determines that there is a second type of fault in compressor 40 in step 122. This second type of fault is indicative of a loss of the command signal wherein the compressor will not start whether this occurs when the compressor was powered off or after the compressor was running and improperly shut down.

If, in step 114, controller 50 determines that whether $|f_{SET}-f_{COMP}|$ is not greater than $THRESH_2$, controller 50 decrements $T_{CB}$ if $T_{CB}$ is greater than zero in step 124 and stores $f_{COMP}$ in a buffer in step 126. Then, in step 128, controller 50 determines whether there has been no change in $f_{COMP}$ for a time trigger period $THRESH_{COMPC}$. If so, controller 50 determines that there is a third type of fault in compressor 40 in step 130. This third type of fault is indicative of a compressor failure wherein the compressor has stopped working.

If controller 50 determines in step 128 that there is a change in $f_{COMP}$, controller 50 increments a counter $T_{DELAY}$) if less than a time trigger period $THRESH_{DELAY}$ in step 131 and then determines whether $T_{DELAY}$ has exceeded $THRESH_{DELAY}$ in step 132. If not, controller 50 determines that there is no fault in compressor 40 in step 134. If $T_{DELAY}$) has exceeded $THRESH_{DELAY}$, controller computes a compressor frequency rate (Freq Rate) in step 136 before proceeding to step 138 (FIG. 3B) in which controller 50 determines if Freq Rate is positive and is greater than a condenser fan fault threshold rate ($THRESH_{CFRATE}$). If so, controller increments a condenser fan counter ($T_{CF}$) in step 140 and determines in step 142 if $T_{CF}$ is greater than a condenser time trigger period ($THRESH_{CF}$). If $T_{CF}$ is not greater than $THRESH_{CF}$, then controller 50 determines that there is no condenser fan fault in step 144 before returning to step 100. However, if $T_{CF}$ is greater than $THRESH_{CF}$, and hence the compressor frequency rate (Freq Rate) is positive and exceeds the condenser fan fault threshold rate ($THRESH_{CFRATE}$) for at least the condenser time trigger period ($THRESH_{CF}$), then controller 50 determines that there is a condenser fan fault in step 146.

During a failure in the condenser fan, there is a change in the system and compressor behavior. One aspect of such a failure is that cabinet temperatures do not respond quickly to the slight change in evaporation temperature. Due to heat transfer changes in the condenser going from forced air (with the fan operational) to natural convection (without the fan), the sealed system adjusts itself to the new condition and the compressor responds to those new pressures. Thus, detecting changes in the compressor yields a more rapid and predictable determination of a condenser fan failure.

If controller 50 determines in step 138 that Freq Rate is either negative or does not exceed $THRESH_{CFRATE}$, controller 50 decrements the condenser fan counter $T_{CF}$ if it is greater than zero in step 150 before proceeding to step 152 in which it determines if Freq Rate is negative and exceeds an evaporator fan fault threshold rate ($THRESH_{EFRATE}$). If Freq Rate is either positive or does not exceed $THRESH_{EFRATE}$, controller 50 decrements an evaporator fan counter $T_{EF}$ if it is greater than zero in step 154 before proceeding to step 162 in which it determines that there is no evaporator fan fault.

If Freq Rate is negative and exceeds $THRESH_{EFRATE}$, controller 50 increments the evaporator fan counter $T_{EF}$ in step 158. Next, controller 50 determines whether $T_{EF}$ is greater than an evaporator time trigger period ($THRESH_{EF}$) in step 160. If not, controller 50 determines that there is no fault and returns to step 100. If $T_{EF}$ is greater than $THRESH_{EF}$, and hence the compressor frequency rate (Freq Rate) is negative and exceeds the evaporator fan fault threshold rate ($THRESH_{EFRATE}$) for at least the evaporator time trigger period ($THRESH_{EF}$), then controller 50 determines that there is an evaporator fan fault in step 164.

During a failure in the evaporator fan, there is a change in the system and compressor behavior. One aspect of such a failure is that cabinet temperatures respond in a very slow rate compared with the sealed system temperature behavior. Due to heat transfer changes in the evaporator going from forced air (with the fan operational) to natural convection (without the fan), the sealed system adjusts itself to the new condition and the compressor responds to those new pressures. Thus, detecting changes in the compressor yields a more rapid and predictable determination of an evaporator fan failure.

Because the compressor frequency rate is independent of the previous steady state level and because any change in the compressor frequency rate is not dependent on a previous or final level, a more reliable system parameter is available to identify condenser and evaporator fan failures.

It is important for algorithm robustness to identify during normal operations which conditions result in a similar dynamic as an evaporator fan, condenser fan, or compressor failures so as to avoid "false" failure detections. With respect to the compressor, the main normal condition that can be falsely identified as a compressor failure is if the compressor has been turned off. In this case, false detection can be avoided by disabling the self-diagnostic routine when the compressor is intentionally turned off.

Potential normal operating conditions that could produce a "false" failure detection with respect to the fans are:
(a) Pull down: In this condition, the temperatures of both refrigerator and freezer compartments need to be pulled down, which can produce rapid change in evaporation and condensation temperature;
(b) Change set point from warm to cold: If the set point for the refrigerator is changed to a colder set point, the compressor turns on and/or increases speed;
(c) Temperature recovery: Door opening or an increase in load can require temperature recovery in which the compressor turns on and/or increases speed; and
(d) Evaporator fan delay: In certain circumstances it may be desirable to delay turning on the evaporator fan such as to cool down the evaporator mass in the beginning of an ON cycle while the compressor remains turned on.

These conditions can result in a change in the compressor frequency or changes in other parameters that could also be detected to identify a failure or to confirm a failure. However, any such changes in compressor frequency can be distinguished from changes in the compressor frequency that result from a fan failure by selecting the appropriate thresholds used in the algorithm described above and shown in FIGS. 3A and 3B. Moreover the direction of the change in compressor frequency rate may be used to distinguish normal operating conditions. For example, when the condenser fan fails, there is a rapid positive change, whereas when the evaporator fan fails, there is a rapid negative change.

Having generally described the operation of controller 50, a more specific example of operation is described below. The following example is provided for purposes of illustration and should not be considered as limiting the scope of the present invention.

EXAMPLE

In this example, various parameters and variables are used by the algorithm executed by controller 50, which is described above in FIGS. 3A and 3B. Parameters are constants that may be stored in non-volatile memory (if available) or in program memory. Parameters may be used to set values for key parts of an algorithm (especially those that are difficult to specify without performance evaluation or are model specific). These variables may be easily modified for development of algorithms and calibration of product performance. A list of the parameters and some exemplary default values and units are provided in Table I appearing at the end of this example. The parameters and variables in Table I are just for reference. Each application may have its own default values for parameters and variables.

TABLE I

| PARAMETER/ VARIABLE | DESCRIPTION | VALUE | UNIT | |
|---|---|---|---|---|
| $f_{SET}$ | Set point frequency | variable | Hz | Target compressor frequency set by the controller |
| $f_{COMP}$ | Compressor frequency | variable | Hz | Measured from the compressor feedback |
| Freq Rate or $\partial f_{COMP}/\partial t$ | Compressor frequency rate | variable | Hz/sec | Calculated by the controller using $f_{COMP}$ as measured over time |
| $THRESH_2$ | Threshold difference for $|f_{SET} - f_{COMP}|$ | 15 | Hz | Difference threshold for indicating compressor failure B |
| $THRESH_{COMPA}$ | First compressor time trigger period | 120 | sec | Threshold time to detect compressor feedback failure A |
| $THRESH_{COMPB}$ | Second compressor time trigger period | 120 | sec | Threshold time to detect compressor input signal failure B |
| $THRESH_{COMPC}$ | Third compressor time trigger period | 120 | sec | Threshold time to detect compressor failure C |
| $THRESH_{DELAY}$ | Time delay for trigger period | variable | sec | Threshold delay to check condition for failure |
| $THRESH_{CF}$ | Condenser time trigger period | 60 | sec | Threshold time to detect condenser fan failure |
| $THRESH_{EF}$ | Evaporator time trigger period | 60 | sec | Threshold time to detect evaporator fan failure |
| $THRESH_{CFRATE}$ | Condenser fan fault threshold rate | 0.005 | Hz/sec | Threshold compressor frequency rate at which to detect condenser fan failure |
| $THRESH_{EFRATE}$ | Evaporator fan fault threshold rate | −0.005 | Hz/sec | Threshold compressor frequency rate at which to detect evaporator fan failure |
| $T_{CA}$ | Compressor counter for failure A | variable | sec | Incremented counter used to determine if $THRESH_{COMPA}$ time has passed |
| $T_{CB}$ | Compressor counter for failure B | variable | sec | Incremented counter used to determine if $THRESH_{COMPB}$ time has passed |
| $T_{CC}$ | Compressor counter for failure C | variable | sec | Incremented counter used to determine if $THRESH_{COMPC}$ time has passed |
| $T_{DELAY}$ | | variable | sec | Incremented counter used to determine if $THRESH_{DELAY}$ time has passed |
| $T_{CF}$ | Condenser fan failure counter | variable | sec | Incremented counter used to determine if $THRESH_{CF}$ time has passed |
| $T_{EF}$ | Evaporator fan failure | variable | sec | Incremented counter used to |

TABLE I-continued

| PARAMETER/VARIABLE | DESCRIPTION | VALUE | UNIT | |
|---|---|---|---|---|
| | counter | | | determine if $THRESH_{EF}$ time has passed |
| i | Filter index | 60 | — | Used to determine how many samples of $f_{COMP}$ are used to compute Freq Rate |

Figure 3A:
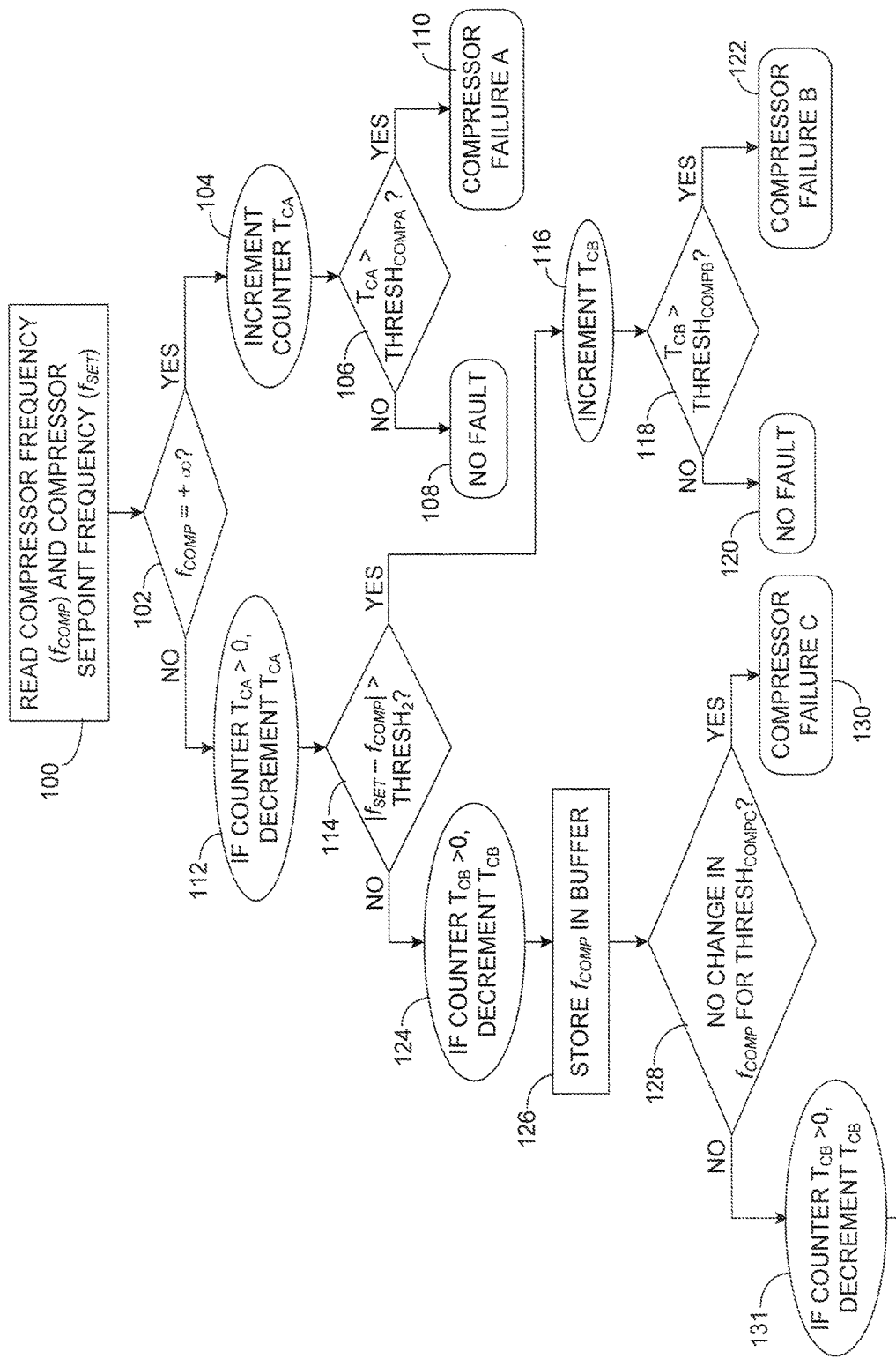
FIGS. 3A and 3B are flow diagrams illustrating steps of an exemplary algorithm that may be executed by the main control circuit of FIG. 2.
Figure 3B:
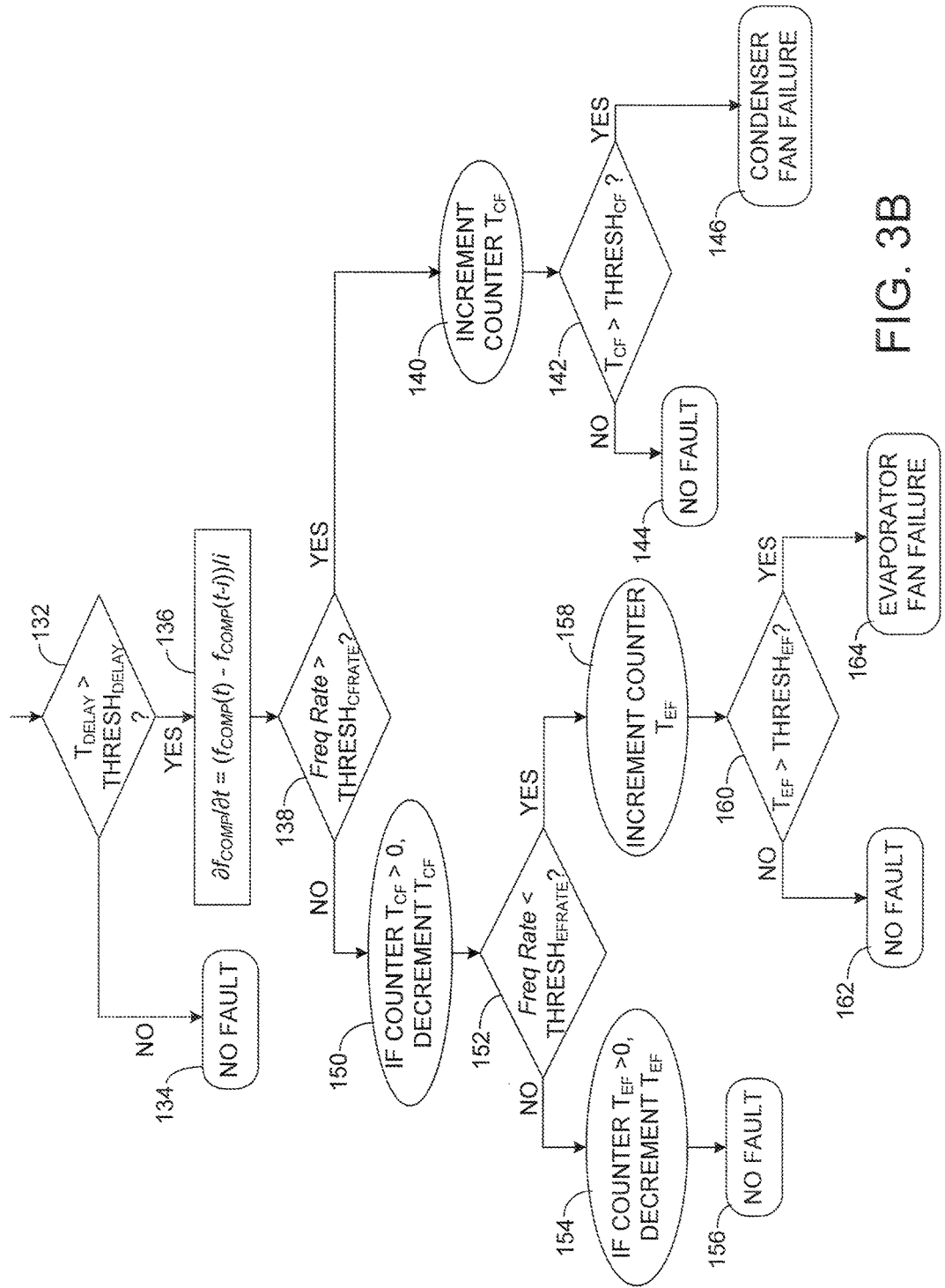
Figure 4:
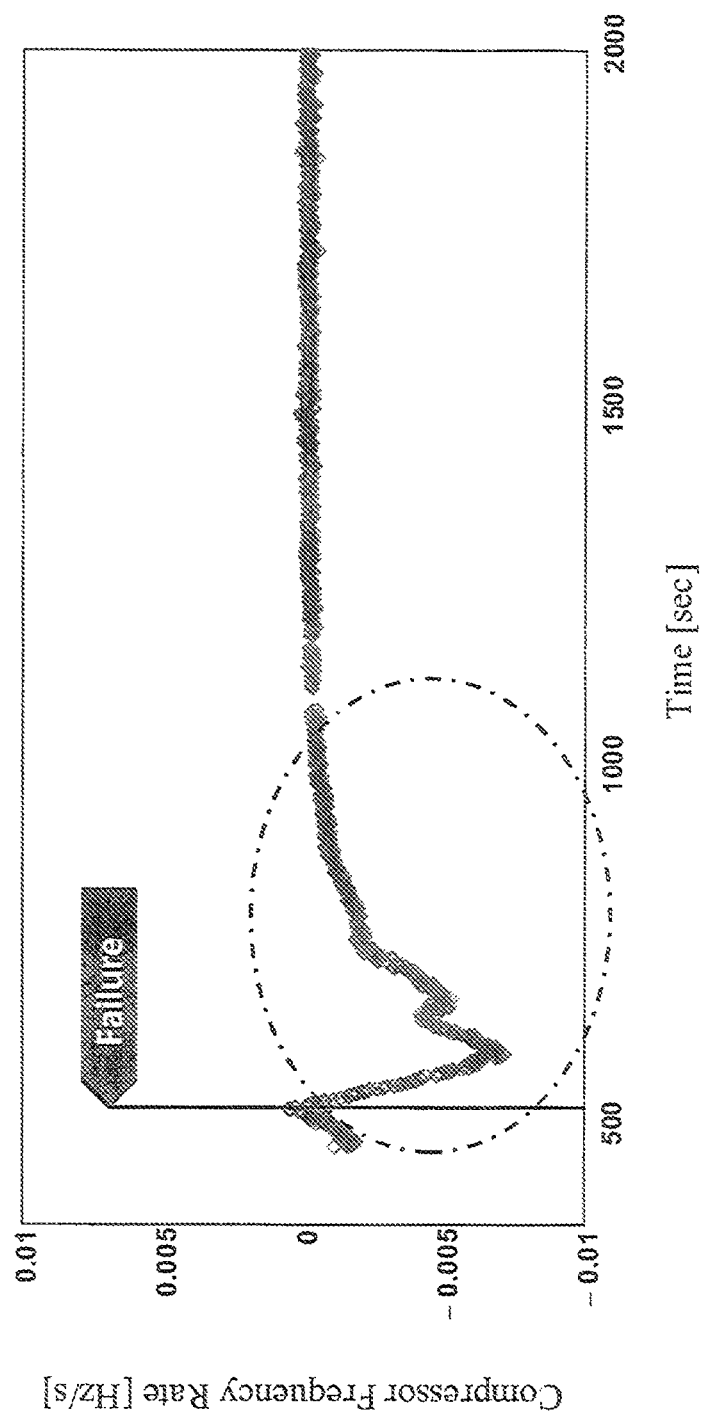
FIG. 4 is an exemplary plot of compressor frequency versus time illustrating an evaporator fan failure.

In this example, the above parameters and variables were used in a refrigerator using the aforementioned Britten compressor and the algorithm of FIGS. 3A and 3B. The system was tested in various conditions to identify the compressor characteristics both when failures occurred and when the system was operating normally. The system was operated in a steady state for 30 minutes, with a failure mode reproduced thereafter and continued for 30 minutes before returning to a normal state for another 30 minutes. First, tests were run to identify when evaporator fan failures occurred. With the evaporator fan in an initial OFF state, an environmental temperature of 70° F., the compressor power set to 67 W (60 Hz), the condenser fan ON, the set point at cold/cold (−5° F./33° F.) and the evaporator fan subsequently turned on at minimum speed (8V) and then caused to fail, a plot of the compressor frequency rate vs. time was obtained. This plot is illustrated in FIG. 4. As shown, once the evaporator fan failure occurred, there was a rapid negative change in the compressor frequency rate where the rate fell below −0.005 Hz/sec, which is the evaporator fan fault threshold rate ($THRESH_{EFRATE}$) and stayed there for at least 60 seconds, which is the evaporator time trigger period ($THRESH_{EF}$). Tests were then repeated varying one of the following test parameters at a time: the compressor power was varied between 67 W (60 Hz), 134 W (105 Hz), and 200 W (150 Hz), and the evaporator fan was switched between minimum speed (8V) and maximum speed (12V) for each of the compressor powers. Similar results were observed as shown in FIG. 4 for these subsequent tests thereby validating the thresholds used to accurately identify when a failure occurred, while also ensuring that no false detections occurred.

Figure 5:
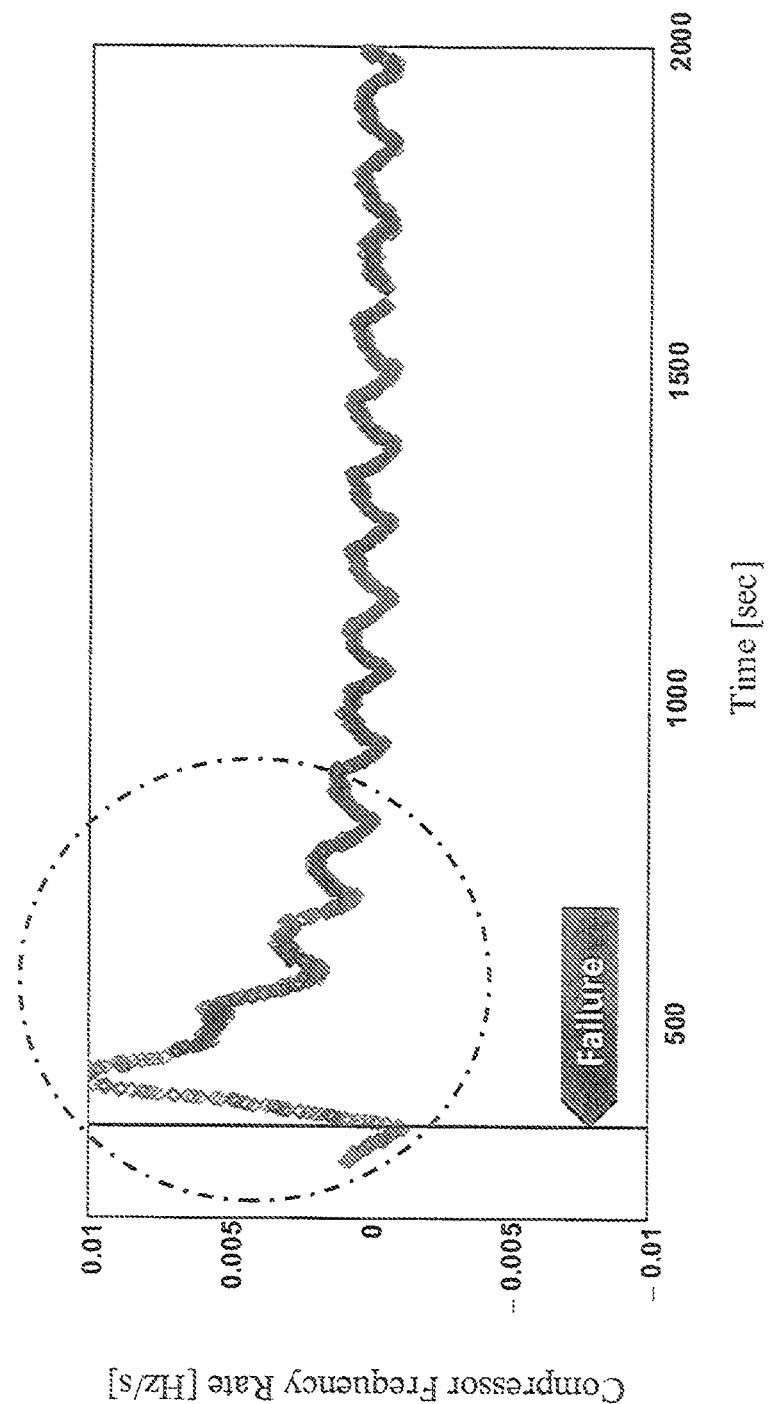
FIG. 5 is an exemplary plot of compressor frequency versus time illustrating a condenser fan failure.

Similar tests were performed to test for condenser fan failure. With the condenser fan in an initial OFF state, an environmental temperature of 70° F., the compressor power set to 67 W (60 Hz), the condenser fan ON, the set point at cold/cold (−5° F./33° F.) and the evaporator fan subsequently operating at minimum speed (8V), the condenser fan was then caused to fail and a plot of the compressor frequency rate vs. time was obtained. This plot is illustrated in FIG. 5. As shown, once the condenser fan failure occurred, there was a rapid positive change in the compressor frequency rate where the rate exceeded 0.005 Hz/sec, which is the condenser fan fault threshold rate ($THRESH_{CFRATE}$) and stayed there for at least 60 seconds, which is the condenser time trigger period ($THRESH_{CF}$). Tests were then repeated varying one of the following test parameters at a time: the compressor power was varied between 67 W (60 Hz), 134 W (105 Hz), and 200 W (150 Hz), and the evaporator fan was switched between minimum speed (8V) and maximum speed (12V) for each of the compressor powers. Similar results were observed as shown in FIG. 5 for these subsequent tests thereby validating the thresholds used to accurately identify when a failure occurred, while also ensuring that no false detections occurred.

As for the compressor, similar tests were run while emulating the three compressor failures noted above (no feedback signal, no input signal, and compressor failure). In each case, the diagnostic system identified the faults without any false detection.

To further ensure the robustness of the algorithm, the above tests were repeated using an environmental temperature of 90° F. with a warm/warm setting, an environmental temperature of 90° F. in a pull down mode, and an environmental temperature of 70° F. in a pull down mode. Failure detection was made in all appropriate situations with no false detections.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A sealed refrigerant system, the refrigerant system comprising:
    an evaporator receiving refrigerant in liquid phase for evaporating the refrigerant into a vapor phase;
    an evaporator fan for moving air external to said evaporator;
    a compressor for receiving the refrigerant in vapor phase and for compressing the refrigerant;
    a condenser for receiving the refrigerant in vapor phase and for condensing the refrigerant into a liquid phase that is supplied to said evaporator;
    a condenser fan for moving air external to said condenser; and
    a controller coupled to said compressor, said controller transmitting control signals to said compressor and receiving a feedback signal from said compressor from which a compressor frequency of said compressor is determined, said controller identifying a fault in said condenser fan as a function of the compressor frequency.

2. The sealed refrigerant system of claim 1, wherein said compressor is a linear compressor.

3. The sealed refrigerant system of claim 1, wherein said controller identifies a fault in said condenser fan as a function of the compressor frequency and a time trigger period.

4. The sealed refrigerant system of claim 1, wherein said controller calculates a compressor frequency rate based upon the rate of change of the compressor frequency and identifies a fault in said condenser fan in response to the compressor frequency rate reaching a condenser fan fault threshold rate.

5. The sealed refrigerant system of claim 4, wherein said controller identifies a fault in said condenser fan in response to the compressor frequency rate being positive and exceeding a condenser fan fault threshold rate for at least a condenser time trigger period.

6. The sealed refrigerant system of claim 1, wherein said controller calculates a compressor frequency rate based upon the rate of change of the compressor frequency and identifies a fault in said evaporator fan in response to the compressor frequency rate reaching an evaporator fan fault threshold rate.

7. The sealed refrigerant system of claim 1, wherein said controller identifies a fault in said compressor in response to the compressor frequency rate maintaining a first compressor fault indicator level for at least a first compressor time trigger period.

8. A sealed refrigerant system, the refrigerant system comprising:
an evaporator receiving refrigerant in liquid phase for evaporating the refrigerant into a vapor phase;
an evaporator fan for moving air external to said evaporator;
a compressor for receiving the refrigerant in vapor phase and for compressing the refrigerant;
a condenser for receiving the refrigerant in vapor phase and for condensing the refrigerant into a liquid phase that is supplied to said evaporator;
a condenser fan for moving air external to said condenser; and
a controller coupled to said compressor; said controller transmitting control signals to said compressor and receiving a feedback signal from said compressor from which a compressor frequency of said compressor is determined, said controller identifying a fault in said evaporator fan as a function of the compressor frequency.

9. The sealed refrigerant system of claim 8, wherein said compressor is a linear compressor.

10. The sealed refrigerant system of claim 8, wherein said controller identifies a fault in said evaporator fan as a function of the compressor frequency and a time trigger period.

11. The sealed refrigerant system of claim 8, wherein said controller calculates a compressor frequency rate based upon the rate of change of the compressor frequency and identifies a fault in said evaporator fan in response to the compressor frequency rate reaching an evaporator fan fault threshold rate.

12. The sealed refrigerant system of claim 11, wherein said controller identifies a fault in said evaporator fan in response to the compressor frequency rate being negative and exceeding an evaporator fan fault threshold rate for at least an evaporator time trigger period.

13. The sealed refrigerant system of claim 8, wherein said controller calculates a compressor frequency rate based upon the rate of change of the compressor frequency and identifies a fault in said condenser fan in response to the compressor frequency rate reaching a condenser fan fault threshold rate.

14. The sealed refrigerant system of claim 8, wherein said controller identifies a fault in said compressor in response to the compressor frequency rate maintaining a first compressor fault indicator level for at least a first compressor time trigger period.

15. A sealed refrigerant system, the refrigerant system comprising:
an evaporator receiving refrigerant in liquid phase for evaporating the refrigerant into a vapor phase;
an evaporator fan for moving air external to said evaporator;
a compressor for receiving the refrigerant in vapor phase and for compressing the refrigerant, the compressor having a piston that is displaced;
a condenser for receiving the refrigerant in vapor phase and for condensing the refrigerant into a liquid phase that is supplied to said evaporator;
a condenser fan for moving air external to said condenser; and
a controller coupled to said compressor for transmitting control signals to said compressor and for receiving a feedback signal from said compressor from which a compressor frequency of said compressor is determined based upon displacement of the piston within said compressor, said controller identifying a fault in said compressor as a function of the compressor frequency.

16. The sealed refrigerant system of claim 15, wherein said compressor is a linear compressor.

17. The sealed refrigerant system of claim 15, wherein said controller identifies a fault in said compressor as a function of the compressor frequency and a time trigger period.

18. The sealed refrigerant system of claim 15, wherein said controller identifies a fault in said compressor in response to the compressor frequency rate maintaining a first compressor fault indicator level for at least a first compressor time trigger period.

19. The sealed refrigerant system of claim 15, wherein said controller identifies a fault in said compressor in response to a difference between a compressor set point frequency and the compressor frequency as measured by said controller exceeding a second compressor fault threshold for at least a second compressor time trigger period.

20. The sealed refrigerant system of claim 15, wherein said controller identifies a fault in said compressor in response to there being no change in the compressor frequency for at least a third compressor time trigger period.

* * * * *